United States Patent
Choudhury et al.

(10) Patent No.: US 10,062,152 B2
(45) Date of Patent: Aug. 28, 2018

(54) SYSTEM FOR CONVERSION OF LOW DYNAMIC RANGE IMAGES TO HIGH DYNAMIC RANGE IMAGES

(71) Applicant: Sharp Laboratories of America, Inc., Camas, WA (US)

(72) Inventors: Anustup Kumar Choudhury, Palo Alto, CA (US); Xiao-Fan Feng, Camas, WA (US); Petrus J. L. Van Beek, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 15/220,821

(22) Filed: Jul. 27, 2016

(65) Prior Publication Data
US 2018/0033125 A1 Feb. 1, 2018

(51) Int. Cl.
  *G06T 5/00* (2006.01)
  *G06T 5/40* (2006.01)
  *G06K 9/46* (2006.01)

(52) U.S. Cl.
  CPC ............ *G06T 5/009* (2013.01); *G06K 9/4647* (2013.01); *G06T 5/008* (2013.01); *G06T 5/40* (2013.01); *G06T 2207/10024* (2013.01); *G06T 2207/20072* (2013.01); *G06T 2207/20208* (2013.01)

(58) Field of Classification Search
  None
  See application file for complete search history.

(56) References Cited

U.S. PATENT DOCUMENTS

| | | |
|---|---|---|
| 8,330,768 B2 | 12/2012 | Mantiuk et al. |
| 8,743,291 B2 | 6/2014 | Li et al. |
| 8,908,055 B2 | 12/2014 | Furumura et al. |
| 8,948,537 B2 | 2/2015 | Rempel et al. |
| 8,964,124 B2 | 2/2015 | Fujine et al. |
| 9,020,257 B2 | 4/2015 | El-Mahdy et al. |

(Continued)

OTHER PUBLICATIONS

Im, J.—"Dark Channel Prior-Based Spatially Adaptive Contrast Enhancement for Back Lighting Compensation"—IEEE 2013, pp. 2464-2468.*

(Continued)

*Primary Examiner* — Bernard Krasnic
(74) *Attorney, Agent, or Firm* — ScienBiziP, P.C; Steve Reiss

(57) ABSTRACT

A method for using a computing device for modifying a lower dynamic range image to a higher dynamic range image is described. According to the method, a lower dynamic range image including a plurality of pixels is analyzed by estimating a dark channel of the plurality of pixels of the lower dynamic range image. A histogram of the dark channel is analyzed by determining the brightest peak and a local minima of the histogram. Using the local minima of the histogram as a threshold for specular highlight determination, a binary mask for specular highlight determination is computed. A final mask is created by multiplying the luminance value of the lower dynamic range image with the binary mask. The final mask is then used to determine the higher dynamic range image. A system for converting a lower dynamic range image to a higher dynamic range image displays the higher dynamic range image on a higher dynamic range display.

7 Claims, 8 Drawing Sheets

(56) References Cited

U.S. PATENT DOCUMENTS

| | | |
|---|---|---|
| 9,129,388 B2 | 9/2015 | Finlayson et al. |
| 2011/0188775 A1* | 8/2011 | Sun .................... G06K 9/40 382/274 |
| 2016/0358319 A1* | 12/2016 | Xu .................... H04N 1/4072 |

OTHER PUBLICATIONS

He, K.—"Single Image Haze Removal Using Dark Channel Prior"—IEEE 2011, pp. 2341-2353.*
Im, J.—"Single image-based spatially adaptive dynamic range extension using combined color-channels transmission map"—Optik (2015), pp. 912-916.*
Zou, B.—"Specularity Removal using Dark Channel Prior"—Journal of Information Science and Engineering (2013), pp. 835-849.*
R. Kovaleski et al., High-Quality Brightness Enhancement Functions for Real-Time Reverse Tone Mapping, The Visual Computer, Springer, vol. 25, Nos. 5-7, May 2009, 8 pgs.
Y. Huo et al., Dodging and Burning Inspired Inverse Tone Mapping Algorithm, Journal of Computational Information Systems 9: 9 (2013) (www.Jofcis.com), pp. 3461-3468.
Y. Huo et al., Inverse Tone Mapping Based upon Retina Response, Scientific World Journal, vol. 2014, Article ID 68564, (2014) 5 pgs.
P. Kuo et al., Content-Adaptive Inverse Tone Mapping, Visual Communications and Image Processing, 2012, 6 pgs.
H. Wang et al., Low Visual Difference Virtual High Dynamic Range Image Synthesizer from a Single Legacy Image, ICIP, 2011 18th IEEE International Conference on Image Processing, (2011), 4 pgs.
A. Rempel et al., Ldr2Hdr: On-the-fly Reverse Tone Mapping of Legacy Video and Photographs, ACM SIGGRAPH, vol. 26, No. 3, Article 39, Pub. Date 2007, 6 pgs.
F. Banterle et al., High Dynamic Range Imaging and Low Dynamic Range Expansion for Generating HDR Content, Eurographics 2009, 28 pgs.
F. Banterle et al., Inverse Tone Mapping, Graphite 2006, 9 pgs.
S. Daly et al., Reserved Highlight Region for HDR and Megacontrast Display Algorithms, SID 10 Digest, (2010), 4 pgs.
S. Daly et al., Decontouring: prevention and removal of false contour artifacts, Human Vision and Electronic Imaging XI 2004, 20 pgs.
T. Kanda et al., An Approach for Reproducing Illuminant Colors and Specular Highlights on Television Using Color-Mode-Index (CMI), Journal of The Institute of Image Information and Television Engineers, vol. 66, No. 10, (2012) pp. J346-J353.
H. Kim et al., Specular Reflection Separation using Dark Channel Prior, CVPR 2013, 8 pgs.
K. He et al., Single Image Haze Removal Using Dark Channel Prior, CVPR 2009, 8 pgs.
B. Masia et al., Evaluation of Reverse Tone Mapping Through Varying Exposure Conditions, ACM TOG 2007, 8 pgs.
R. Mantiuk et al., HDR-VDP-2: A calibrated visual metric for visibility and quality predictions in all luminance conditions, ACM TOG 2011, 13 pgs.
M. Narwaria et al., HDR-VDP-2.2: A Calibrated Method for Objective Quality Prediction of High Dynamic Range and Standard Images, Journal of Electronic Imaging, Society of Photo-optical Instrumentation Engineers, 2015, 6 pgs.

* cited by examiner

SYSTEM FOR CONVERSION OF LOW DYNAMIC RANGE IMAGES TO HIGH DYNAMIC RANGE IMAGES

CROSS-REFERENCE TO RELATED APPLICATIONS

Not applicable.

BACKGROUND OF THE INVENTION

The present invention generally relates to the conversion of low dynamic range images to high dynamic range images.

Selected digital photograph imaging devices and digital video imaging devices can capture relatively high dynamic range images. High dynamic range images capture most of the dynamic range of real world luminance which are more readily displayed with a display having a corresponding high dynamic range. Accordingly, capturing images with a suitably high dynamic range together with rending the captured images with a suitably high dynamic range display provides a representation of the image content that is generally consistent with real world illumination ranges.

Most of the image capture devices only have the capability of capturing light on the order of about three orders of magnitude as opposed to generally twelve orders of magnitude of real world scenes observable by the human visual system. Traditionally, displays represent a digital image with a set of 256 values per color channel, with a maximum of 65,536 different values. In general, the limitations of only a set of 256 values per color channel may be referred to as low dynamic range images and low dynamic range displays.

As higher dynamic range displays are more readily available, there is an increasing demand to display the lower dynamic range images on the higher dynamic range displays. One technique to convert lower dynamic range images to higher dynamic range images is generally referred to as reverse tone mapping. Reverse tone mapping may be generally performed in two stages. The first stage is performed to inverse map the luminance of a lower resolution input image into an expanded high dynamic range luminance image. As a result of image quantization, this results in a loss of details and introduces noise in high luminance regions of the image. The second stage remediates the results of image quantization by smoothing such regions while also allowing for potentially increasing the dynamic range of the image content.

Another technique to convert lower dynamic range images to higher dynamic range images is to linearly scale the image data. Unfortunately, linearly scaling the image data fails to capture the tonescale aspects of specular highlights in the images.

Another technique to convert lower dynamic range images to higher dynamic range images is to use multiple lower dynamic range images with multiple exposures to determine higher dynamic range images. However, typically there are not multiple different exposures of the same scene image.

DETAILED DESCRIPTION OF PREFERRED EMBODIMENTS

Figure 1:
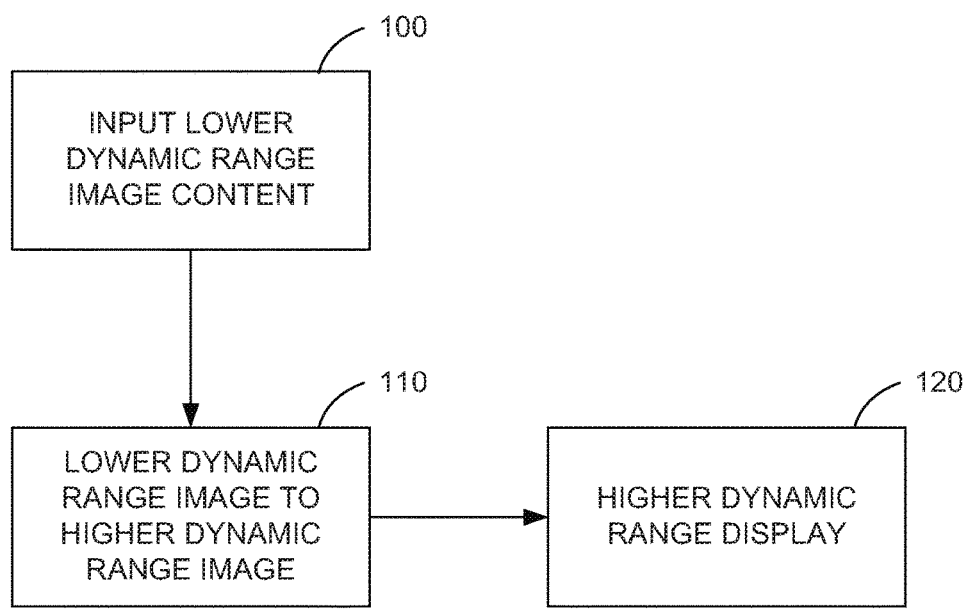
FIG. 1 illustrates a system for converting lower dynamic range images to high dynamic range images.

Referring to FIG. 1, some displays are capable of displaying image content with a higher dynamic range than other displays that are only capable of displaying image content with a lower dynamic range. By way of example, a higher range dynamic range display may have a range of 500 cd/m^2 to 0.7 cd/m^2 and in many cases may have a range from generally from 3000 cd/m^2 or greater to 0.05 cd/m^2 or lower. The dynamic range of the input image content 100 is preferably increased 110 to be generally consistent with that of the display 120 to which the image content is going to be rendered on. The image being presented on the higher dynamic range display is preferably subjectively improved by effectively increasing the dynamic range of the image data. Since most images are already represented in a low dynamic range format (LDR), a technique is desirable to convert the image from the LDR up to a HDR (high dynamic range) format while reducing the introduction of artifacts into the image.

As previously noted, one technique to perform a mapping from a lower dynamic range image to a higher dynamic range image suitable for display on a higher dynamic range display includes a linear stretch from the lower dynamic range to the higher dynamic range. A linear stretch based technique results in a somewhat 'flat' contrast in the modified image. To improve the contrast a nonlinear mapping using a gamma function or other similar function may be used. Unfortunately, the linear and non-linear mapping techniques fail to suitably account for highlight and specular regions of the image content.

To account for the highlights and specular regions of the image it is desirable to estimate a dark channel of the input images. The dark channel may be based upon the observation that for substantial regions of images at least one color channel has some pixels whose intensity are very low and close to zero. Equivalently, the minimum intensity in such a spatial patch of pixels is close to zero. On the other hand, pixels in highlight or specular regions have very high intensity in all color channels. Hence, highlight and specular regions can be more easily discriminated in the dark channel image. One manner of describing the dark channel for an arbitrary image J, its dark channel $J^{dark}$ may be given by $J^{dark}(x) = \min_{y \in \Omega(x)} (\min_{c \in (r,g,b)} J^c(y))$, where $J^c$ is a color channel of J and $\Omega(c)$ is a local patch centered at x. A dark channel is the outcome of two minimum operators $\min_{c \in (r,g,b)}$ performed on each pixel and $\min_{y \in \Omega(x)}$ is a minimum filter. The minimum operators may be commutative. Preferably, the system computes the dark channel based upon all the pixels, although less than all the pixels may be used to compute the dark channel. For example, the dark channel may be based upon a majority of the pixels, more preferably based upon 75% or more of the pixels, and more preferably based upon substantially all of the pixels. While described using red, green, blue (r,g,b) color channels, the dark channel image may be computed in suitable alternative color spaces.

Figure 2:
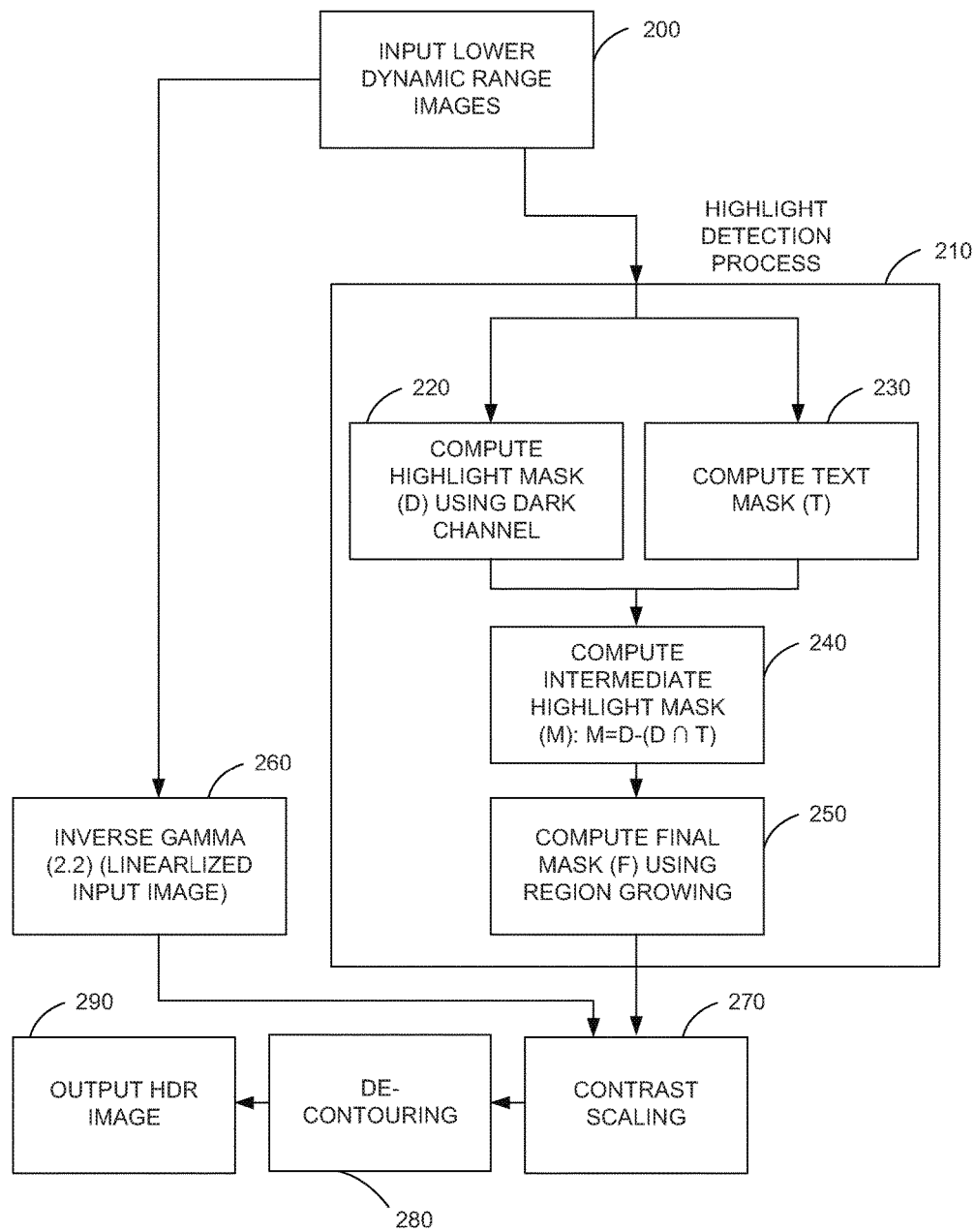
FIG. 2 illustrates a system for converting lower dynamic range images to high dynamic range images.

Referring to FIG. 2, the input may be a series of lower dynamic range (LDR) images 200, such as individual images and/or a series of individual images of a video stream. The LDR images 200 may be processed to determine the highlights within the images 200 using a highlight detection process 210. The highlight detection process 210 may compute the corresponding dark channel highlight mask 220 based upon each of the input images 200 to determine the highlight mask (D). For most natural images, a diffuse pixel in an image is likely to have a very low intensity in at least one color channel. Contrary, for non-natural portion of images, there is a greater likelihood of not having a diffuse pixel with a very low intensity in at least one color channel. In this manner, an initial estimate of the specular reflection of the input image may be determined based upon the dark channel highlight mask (D) 220.

Figure 3:
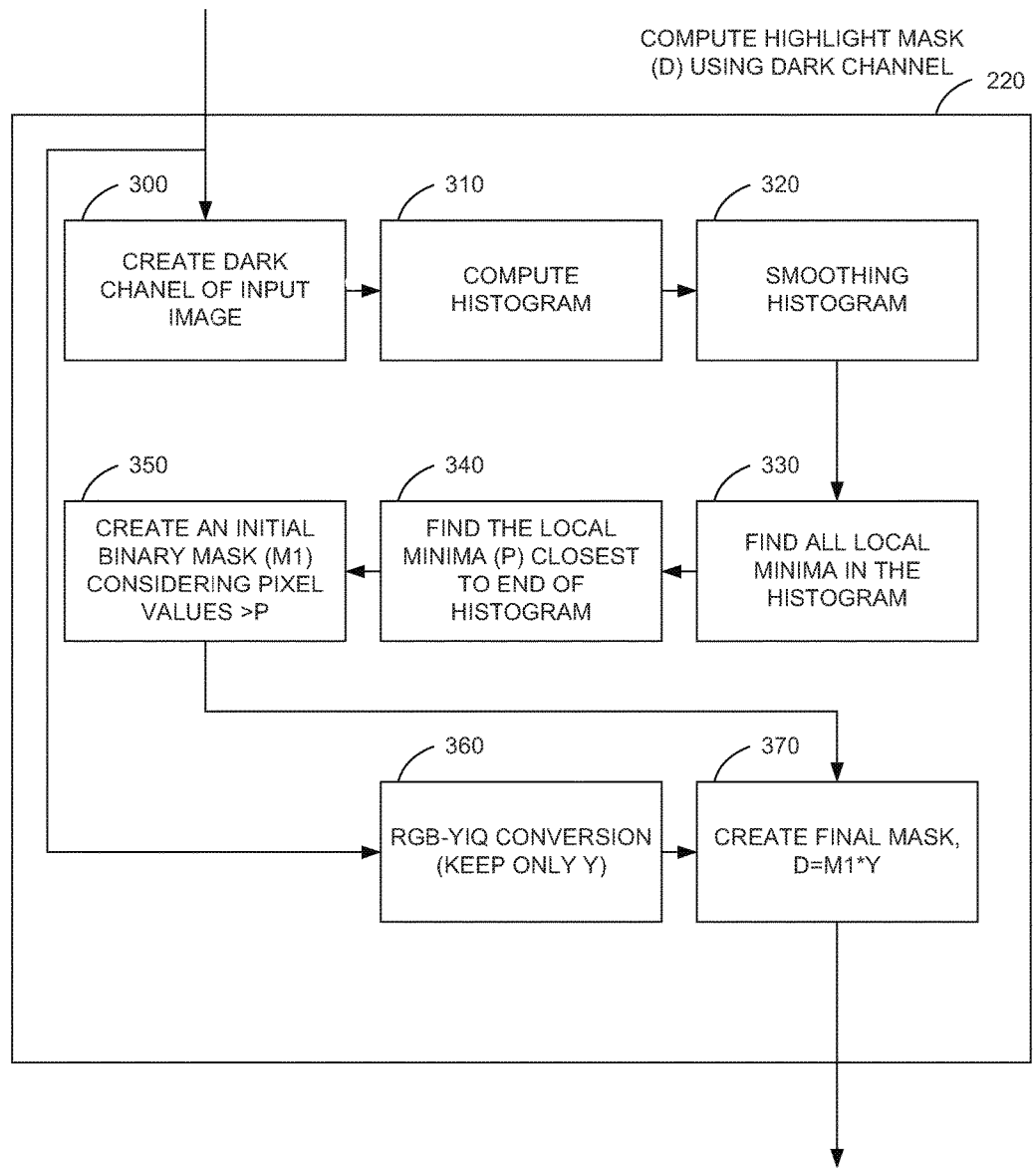
FIG. 3 illustrates a technique to creating a dark channel mask for an image.
Figure 4:
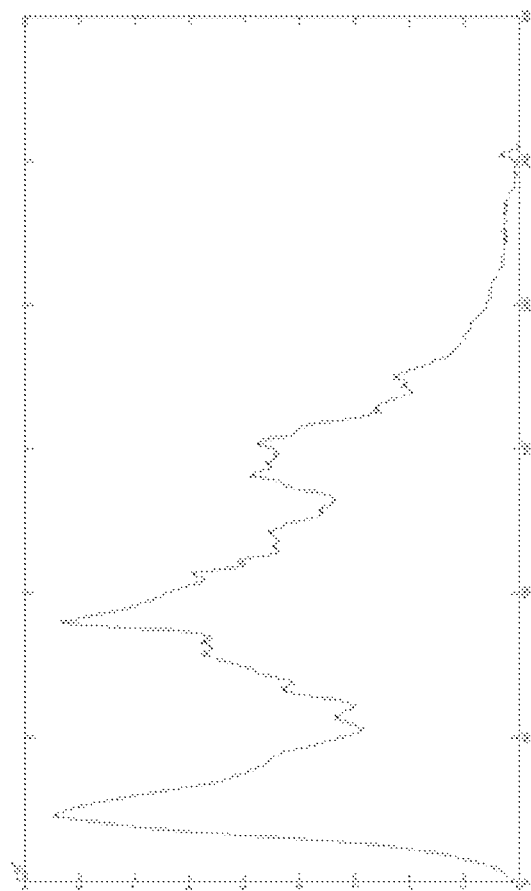
FIG. 4 illustrates a set of local maxima and local minima.
Figure 5:
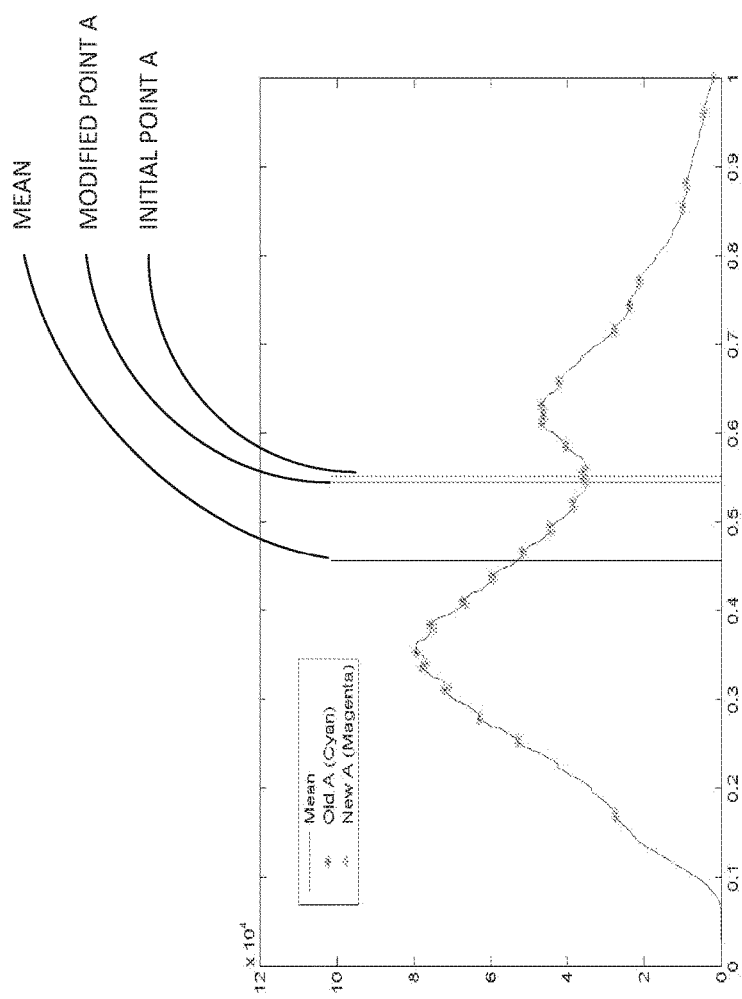
FIG. 5 illustrates points for contrast scaling.
Figure 6:
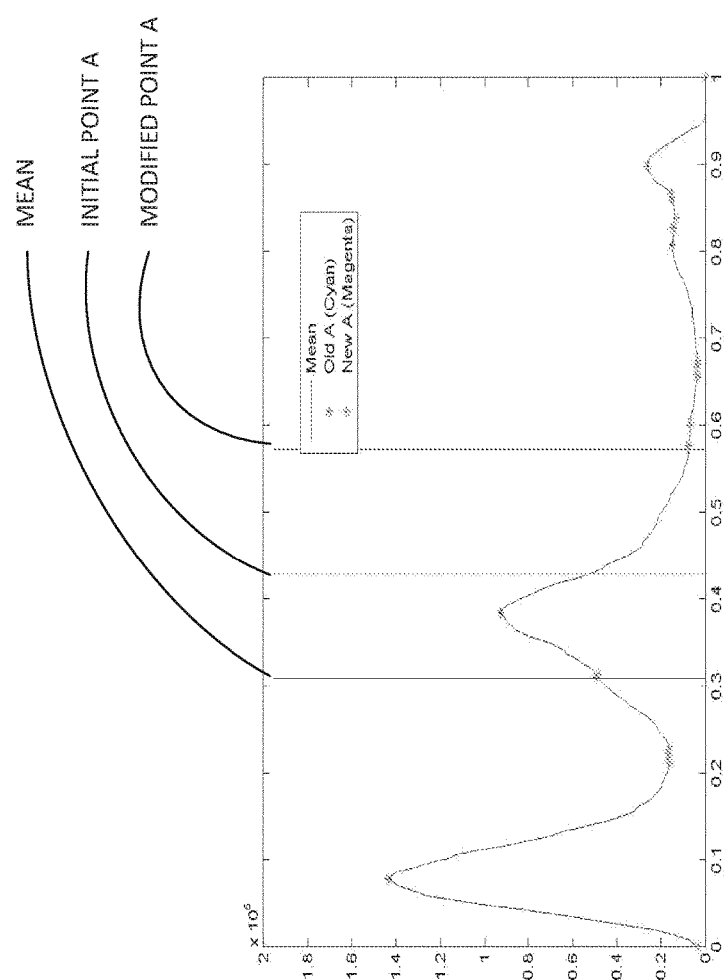
FIG. 6 illustrates points for contrast scaling.
Figure 7:
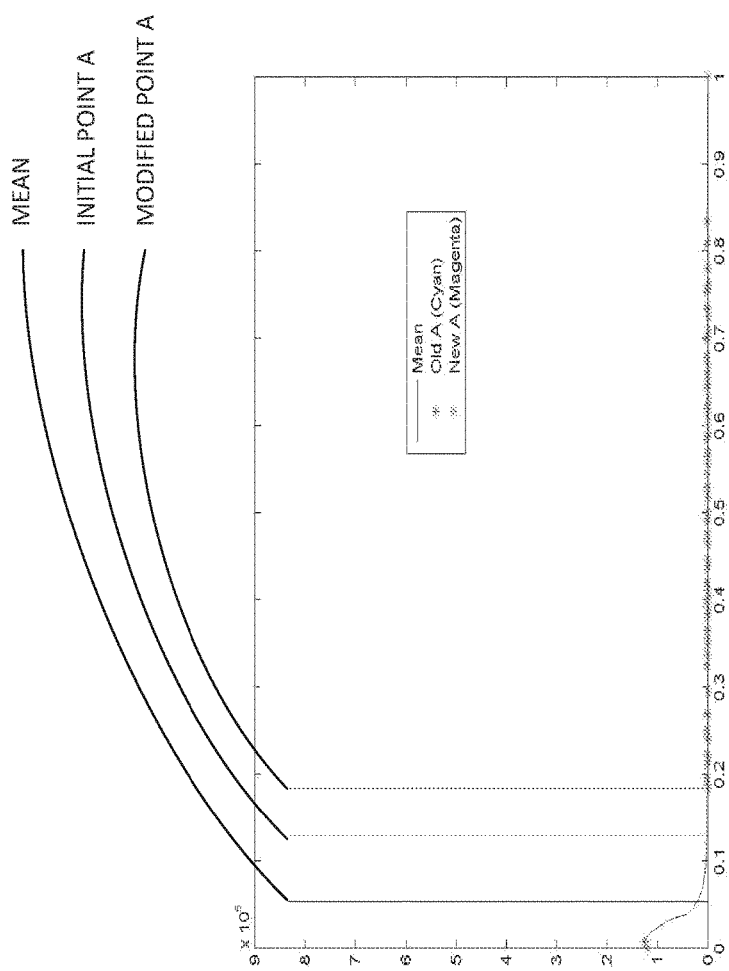
FIG. 7 illustrates points for contrast scaling.
Figure 8:
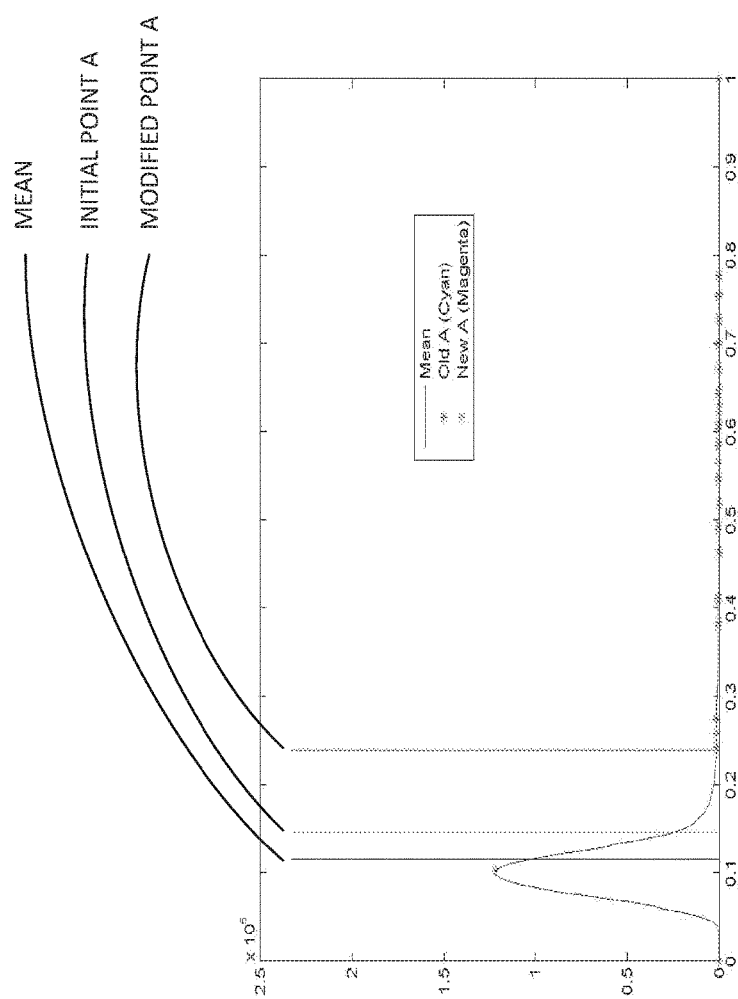
FIG. 8 illustrates points for contrast scaling.

Referring also to FIG. 3, the dark channel image 220 may be used to determine image regions corresponding to specular highlights. The dark channel 300 may be computed such that it includes the minimum of each of the color channels. The resulting dark channel 300 may then be arranged as a histogram 310 of the dark channel. As a result of determining the histogram 310, it tends to include irregularities, which may be modified by smoothing 320 the histogram. The resulting histogram, and smoothed if desired, typically includes a series of local maxima (e.g., peaks) and local minima (e.g., valley). Preferably, all the local minima 330 are determined within the histogram, such as illustrated in FIG. 4.

Often the highlights are the bright regions of natural images. Consequently, such highlights will tend to be present toward the upper end of the histogram. Consequently, if there are such highlights in an image, there should be a peak proximate the upper end of the histogram. Therefore, it is desirable to consider the brightest peak in the histogram to be an initialization point and then consider the $1^{st}$ valley before the peak 340 as a threshold (P) for specular highlight detection. The system may then compute an initial binary mask M1 for the specular highlight detection, such that all the values are greater than P. The binary mask M1 350 may be multiplied by the luminance value of the respective LDR image 360 to create a final mask D1 370.

While the identification of the specular highlights using the final mask D1 370 identifies many of the specular highlights, unfortunately those specular highlights also tend to identify textual regions of the images that are preferably not identified as specular highlights. Referring again to FIG. 2, the system preferably determines those regions of each of the LDR images 200 that include textual regions and determines a text mask (T) 230 that identifies the textual regions. An intermediate highlight mask 240 may be computed as those pixels identified by the highlight mask (D) 220 that are not also included in the text mask (T) 230.

Although the dark channel mask, especially without the textual regions, provides a useful initial estimate of the highlight regions, it does not necessarily cover the entire bright regions. Consequently, it is desirable to use region growing 250 on the initial estimate of the highlight mask depending on the pixel values in the Y channel of the YIQ image. The resulting final mask (F) 250 may be applied against an inverse gamma input image 260 to determine a suitable high dynamic range image.

The process of determining the high dynamic range image may include contrast scaling 270. Referring also to FIG. 5, FIG. 6, FIG. 7, and FIG. 8, the contrast scaling 270 may be based upon first defining point A in the histogram as the mean+0.5*sigma. The position of A in the histogram may be further modified to localize A to the nearest valley. This assists in an improved understanding of the histogram regions since the different regions of the histogram correspond to the local peaks and valleys of the histogram. In many cases, A is already close to a valley of the histogram. With the identification of point A in the histogram, a point B may be set in the histogram as the minimum of the pixel values in the specular highlight mask of the histogram. With the point A and point B identified in the histogram, they may be used as a basis for the conversion of the lower dynamic range image to a higher dynamic range image. Other techniques may likewise be used to increase the dynamic range of the input images.

Unfortunately, contour artifacts tend to be generated as a result of the contrast scaling 270. As a result of the contour artifacts, a de-contouring 280 process may be selectively applied in only the bright regions of the image (or to an extent greater than the non-bright regions of the image), such as where the pixel values are greater than A. Applying the de-contouring 280 in the darker regions of the image tends to result in significant texture loss. The result of the de-contouring 280 may be the output HDR image 290.

In another embodiment, one or more of the detection processes may be from one or more previous frames, with the results being used on the current or subsequent frame. For example, the detection processes may include one or more of determining the histogram of the image and/or the dark channel, determining thresholds, and determining points A and B.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method for using a computing device for modifying a lower dynamic range image to a higher dynamic range image comprising:
   receiving said lower dynamic range image including a plurality of pixels;
   estimating a dark channel of said plurality of pixels of said lower dynamic range image;
   determining a histogram of said dark channel;
   determining the brightest peak and a local minima of said histogram;
   using said local minima of said histogram as a threshold for specular highlight determination, computing a binary mask for said specular highlight determination;
   multiplying the luminance value of said lower dynamic range image with said binary mask to create a final mask; and
   using said final mask, determining said higher dynamic range image.

2. The method of claim 1 wherein said estimating said dark channel includes selecting a minimum intensity of the color channels at each pixel for substantially all of said plurality of pixels of said lower dynamic range image.

3. The method of claim 1 wherein said estimating said dark channel includes selecting a minimum intensity of the color channels at each pixel for a majority of said plurality of pixels of said lower dynamic range image.

4. The method of claim 1 wherein said estimating said dark channel includes selecting a minimum intensity of the color channels at each pixel for at least 75 percent of said plurality of pixels of said lower dynamic range image.

5. The method of claim 1 further comprising smoothing said histogram of said dark channel.

6. The method of claim 1 wherein said determining said higher dynamic range image further includes a determining of textual regions of said lower dynamic range image.

7. The method of claim 1 wherein said determining said higher dynamic range image further includes contrast scaling.

\* \* \* \* \*